Patented Dec. 3, 1946

2,411,983

UNITED STATES PATENT OFFICE 2,411,983

PROCESS FOR CATALYZED ABNORMAL ADDITION REACTIONS

William E. Vaughan and Frederick F. Rust, Berkeley, Calif., assignors to Shell Development Company, San Francisco, Calif., a corporation of Delaware No Drawing. Application June 24, 1944, Serial No. 542,028

13 Claims. (Cl. 204—163)

This invention relates to an improved method for the addition of hydrogen sulfide and/or mercaptans to symmetrical or unsymmetrical organic compounds containing one or more unsaturated linkages of aliphatic character. In one of its more specific embodiments, the invention pertains to a novel method of effecting a controlled reaction between hydrogen sulfide or a mercaptan and unsymmetrical organic compounds containing at least one unsaturated linkage of aliphatic character, i. e. an olefinic or acetylenic bond, to produce addition products of predetermined character.

This application is a continuation-in-part of the copending application, Serial No. 432,049, filed February 23, 1942, now Patent No. 2,398,481, dated April 16, 1946.

It is known that mercaptans and thio-ethers may be produced by reacting hydrogen sulfide or a suitable mercaptan with an unsaturated organic compound, e. g. unsaturated hydrocarbon, at elevated temperatures in the approximate range of from 200° C. to 750° C. In some cases such reactions were effected at superatmospheric pressures. When hydrogen sulfide is reacted with unsaturated organic compounds under the outlined conditions, the sulfhydryl group attaches to the unsaturated carbon atom containing the lesser number of hydrogen atoms attached thereto, so that, as clearly brought out by Jones and Reid (Journal American Chemical Society, vol. 60, pp. 2452–2455), the addition takes place according to Markownikoff's rule. Therefore, when terminally unsaturated olefins are thus reacted with hydrogen sulfide, the reaction product predominates in secondary mercaptans and/or secondary thio-ethers. When the unsaturated organic compounds have been reacted with the mercaptans at the aforementioned elevated temperatures, the sulfur atom of the mercapto radical attached predominantly to the unsaturated carbon atom holding the most hydrogen atoms so that this addition was contrary to the course suggested by the Markownikoff rule. This condition was designated as "abnormal" addition on the assumption that mercaptans should add like halogen acids. With reference to the addition of mercaptans to unsaturated organic compounds, it is known that the abnormal addition may be catalyzed by free oxygen, air, ozone, peroxides, ascaridole, and the like, while compounds of the type of hydroquinone and piperidine act as reaction inhibitors.

It has been recently discovered that hydrogen sulfide may be added to unsaturated organic compounds, contrary to the course suggested by the Markownikoff rule, by effecting the reaction at normal temperatures or even at considerably lower temperatures, under the deliberate influence of ultraviolet radiations having wavelengths of below about 2900 to 3000 Angstrom units. It is known that the presence of peroxides or of peroxide-forming compounds in unsaturated organic compounds, e. g. unsaturated hydrocarbons, is undesirable. The processes involving the abnormal addition of hydrogen sulfide and/or of mercaptans to unsaturated organic compounds under the deliberate influence of ultraviolet radiations necessitate the use of special equipment which is capable of transmitting rays of the defined low wavelengths. In other words, in order to effect the desired reaction it is necessary to employ reaction vessels and/or lamps of quartz or other suitable materials, e. g. calcium fluoride, which are capable of transmitting the defined short wavelengths of 2900 to 3000 Angstrom units and below.

It has now been discovered that unsaturated organic compounds of the class more fully described hereinbelow may be reacted with hydrogen sulfide or mercaptans to effect directional addition thereof via the above-defined "abnormal" addition, this reaction being effected without the necessity of resorting to high temperatures and/or elevated pressures, and in the absence of undesirable peroxides or peroxide-forming compounds. It has also been discovered that this reaction according to this invention may be effected without the necessity of employing any special equipment or apparatus capable of transmitting very low ultraviolet rays, such as radiations having wavelengths of 2900 to 3000 Angstrom units or below. According to the present process, this abnormal addition of hydrogen sulfide or of mercaptans is attained by effecting the reaction under irradiating conditions (and particularly under the deliberate influence of rays which will not otherwise dissociate any one of the reactants), and in the presence of certain catalysts having definite and specific characteristics which promote the abnormal addition but the presence of which in the unsaturated organic compounds is not detrimental. Generally speaking, these catalysts or reaction sensitizers comprise carbonylic compounds which absorb light and which may thus be decomposed photochemically by radiations having wavelengths of about 2900 to 3000 Angstrom units and above.

It has also been discovered that catalysts or sensitizers of the class more fully described herein and consisting of or comprising carbonylic compounds of the type defined hereinbelow will catalyze and control the reaction between an unsaturated organic compound and a mercaptan or hydrogen sulfide so that the reaction will occur via the so-called "abnormal" addition at ordinary or even subnormal temperatures and without the necessity of employing special equipment or apparatus which will transmit ultraviolet radiations having wavelengths of 2900 to 3000 Angstrom units or below.

Broadly stated, the present invention resides in a photochemical process of effecting the addition of suitable mercaptans or hydrogen sulfide in the presence of carbonylic compounds and under the deliberate influence of light capable of photochemically dissociating said catalyst or sensitizer, this reaction being effected at normal temperatures, i. e. in the neighborhood of from about 25° C. to about 15° C., or even at considerably lower temperatures. This photochemical addition occurs contrary to the course suggested by Markownikoff for the addition of hydrogen halides, and in accordance with the rule proposed by Posner (Berichte, vol. 38, p. 646 (1904)) concerning the addition of mercaptans to double bonds.

The unsaturated organic compounds which may be treated according to the process of this invention include hydrocarbons containing one or more olefinic and/or acetylenic linkages. Examples of such hydrocarbons are ethylene, propylene, butene-1, butene-2, isobutylene, pentene-1, pentene-2, hexene-1, 4-methyl-pentene-1, 4,4-dimethyl-pentene-1, 4-methyl-pentene-2, octene-1, decene-1, cetene-1, styrene, cyclohexene, 3-methyl-cyclohexene, 1,4-diphenyl-butene-2, butadiene-1,3, pentadiene-1,3, pentadiene-1,4, hexadiene-1,5, hexadiene-1,4, acetylene, propyne, butyne-1, pentyne-2, hexyne-1, cetyne-1, octyl-acetylene, phenyl-acetylene, cyclopentadiene, and the like. The above compounds, and their various homologues, may be substituted in the nucleus and/or in the substituents in varying degrees. For instance, the unsaturates may contain one or more halogen atoms attached to saturated and/or unsaturated carbon atoms. Representative examples of these compounds are: vinyl halides, allyl halides, crotyl halides, methallyl halides, and the like. Other examples of substituted unsaturated hydrocarbons are methyl acrylate, methyl methacrylate, divinyl ether, diallyl ether, dimethallyl ether, and the like.

A particularly suitable group of organic compounds which may be reacted with mercaptans or hydrogen sulfide via abnormal addition comprises the compounds, and particularly the hydrocarbons, in which the unsaturated linkage is in terminal or alpha position. Also, aliphatic hydrocarbons and their various substituted derivatives, e. g. halosubstituted derivatives, containing unsaturated linkages both in alpha and omega positions (i. e. terminal positions), may be readily reacted with the above-outlined compounds, via abnormal addition, to produce compounds in which both terminal carbon atoms have sulfhydryl or mercapto radicals attached thereto. Another group of organic compounds which may be employed as the primary material comprises or includes organic compounds wherein an olefinic linkage is in non-terminal position between two carbon atoms having a dissimilar number of hydrogen atoms attached to each of said unsaturated carbon atoms due, for example, to various substituents attached thereto. For instance, the double bond may be between two carbon atoms which are of secondary and tertiary character, respectively. Another example is a compound in which the unsaturated carbon atoms are both primary or both secondary, but have unequal numbers of halogen atoms, such as chlorine, bromine, fluorine and/or iodine atoms attached to them.

Any sufficiently stable mercaptan is suitable as a reactant to be employed in the photochemical addition thereof to the above-defined class of unsaturated organic compounds. A suitable mercaptan may contain one or more sulfhydryl groups or radicals, and be of alkyl, aralkyl, alkenyl, aralkenyl or aryl character. The mercapto radical may be linked to an aliphatic or an aromatic carbon atom. In the majority of cases it is preferable to employ the normal or iso alkyl chain mercaptans of primary, secondary or tertiary character, particularly those contained in or derived from petroleum and petroleum products. The methyl, ethyl, butyl, amyl, hexyl, heptyl, octyl and the like mercaptans, as well as their homologues, analogues and substitution products, may be employed with excellent results. Another group of mercaptans which may be employed as one of the two reactants comprises or includes the dimercaptans, and particularly the polymethylene dimercaptans of the general formula $HS(CH_2)_nSH$. This group of mercaptans may be reacted with, for example, aliphatic hydrocarbons containing a plurality of unsaturated linkages to produce thio-ethers having a high molecular weight.

As stated, the substances which may be used as catalysts or sensitizers for the above-outlined reaction, in which mercaptans or hydrogen sulfide are added via abnormal addition, comprise the carbonylic compounds, and particularly those which may be dissociated or decomposed photochemically by means of rays having wavelengths of about 2900 to 3000 Angstrom units and longer. Without any intention of being limited by the compounds enumerated herein, it may be stated that representative compounds of this class include: aliphatic and aromatic ketones, such as acetone, methyl ethyl ketone, methyl n-propyl ketone, methyl isopropyl ketone, diethyl ketone, ethyl n-propyl ketone, methyl n-butyl ketone, dipropyl ketone, acetophenone, and their homologues; aldehydes, such as acetaldehyde, propionaldehyde, isobutyraldehyde, benzaldehyde, and the like, and their homologues; and acid halides, for example acetyl bromide, propionyl bromide, and the like. It is to be understood that there is no intention of contending that all carbonylic compounds which are dissociable by light may be employed equally effectively as catalysts or sensitizers for the described abnormal addition of mercaptans or hydrogen sulfide. For example, some of these carbonylic compounds, in order to be dissociated, may require radiations of much shorter wavelengths than those necessary for the decomposition of other carbonylic compounds. Also, the rate of chain initiation of some carbonylic compounds, although they may be readily decomposed photochemically by radiations of wavelengths above 2900 Angstrom units, is considerably slower than the rate of chain initiation of other carbonylic compounds. This may be due to steric hindrance or even resonance in the radical formed during the decomposition. Nevertheless, it may be generally stated that all carbonylic compounds, and particularly the ketones, aldehydes and acid halides, which are capable of being dissociated by light having wavelengths of about 2900 to 3000 Angstrom units, and longer, may be effectively used as catalysts or sensitizers for the desired abnormal addition reaction.

The abnormal addition reaction between the defined compounds according to the process of the present invention may be effected in the vapor or liquid phase, or in a two-phase liquid-vapor system. Since the abnormal addition reaction occurs photochemically, or under the influence of catalysts or sensitizers which are dissociated to produce radicals which initiate the reaction, no heating is necessary. In fact, in many instances the reaction, although it may be realized at temperatures of about 25° C., is preferably effected at temperatures which are even below 0° C. Also, it was discovered that the abnormal addition of mercaptans or hydrogen sulfide, when the reaction is effected under the influence of the above-defined class of catalysts or sensitizers, proceeds regardless of the presence or absence of a liquid film in the reaction zone. Although the reaction described herein may be promoted or effected by using the whole range of ultraviolet radiations, it has been pointed out above that the presence of the defined catalysts or sensitizers (which, incidentally, do not have a detrimental effect on the reactants) eliminates the necessity of using radiations having very short wavelengths. In other words, whereas abnormal addition of, for example, hydrogen sulfide to an unsaturated organic compound would require ultraviolet radiations having wavelengths of below about 2900 to 3000 Angstrom units, the addition of even small amounts, e. g. from about 1% to about 10%, of a compound of the class of catalysts or sensitizers defined above permits effective addition even when the radiations have longer wavelengths, provided such rays will cause the initial dissociation of the catalyst or sensitizer, thereby initiating the chain mechanism, and at the same time directionally controlling the addition reaction.

The abnormal reaction according to the present process may be effected in a batch, intermittent or continuous manner. When the process is executed batchwise, the reactants, together with a suitable amount of the catalyst or sensitizer of the defined class, may be conveyed under any suitable or optimum pressure and temperature into a suitable container which is then illuminated, preferably with ultraviolet light, for a period of time sufficient to effect the desired addition reaction. Although containers of quartz or the like may be employed, so as to permit light waves of between 2900 and 3000 Angstrom units therethrough, it is possible to employ ordinary glass or Pyrex glass, since wavelengths passing through this type of glass will also dissociate the sensitizer or catalyst and thus initiate and effect the desired reaction.

Although there is no intention of being limited by any details therein, the following illustrative examples represent specific embodiments of the present invention.

*Example I*

Propylene and hydrogen sulfide were introduced in the liquid state and in equal volumetric proportions into a Pyrex glass reactor. The reaction vessel was then sealed and illuminated for a period of about six minutes by radiations emanating from a quartz mercury lamp. The reactor was maintained at a temperature of about 0° C. An analysis of the contents from the reactor showed that only about 4% of the propylene reacted.

*Example II*

The experiment described in Example I was repeated. However, prior to the sealing of the reactor, acetone was added in such an amount that the volumetric ratio of propylene, hydrogen sulfide and acetone in the reactor was 7.4:7.4:1. After the six-minute illumination the reaction mixture was distilled to evaporate the unreacted compounds. It was then found that about 75% of the propylene reacted via abnormal addition, the reaction product consisting of about 80 weight percent of normal propyl mercaptan and about 20 weight percent of di-n-propyl sulfide.

*Example III*

When a substantially equivolumetric mixture of propylene and n-propyl mercaptan, which mixture contains about 5% acetone, is disposed in a Pyrex glass container and is subjected at a temperature of about 0° C. to the action of ultraviolet radiations emanating from a quartz mercury lamp, the reaction product contains appreciable amounts of di-n-propyl sulfide.

*Example IV*

Propylene, hydrogen sulfide and acetaldehyde are introduced in the liquid state into a Pyrex glass container in such amounts that the volumetric ratio of said ingredients is 12:12:1, and are maintained in said container at about 25° C. The illumination of the mixture with ultraviolet radiations emanating from a quartz mercury lamp results in the formation of substantial amounts of n-propyl mercaptan and some di-n-propyl sulfide.

*Example V*

When hexene-1 is reacted with hydrogen sulfide in the presence of a minor amount of acetone and according to the process described in Example II, the reaction product contains n-hexyl mercaptan and di-n-hexyl sulfide.

We claim as our invention:

1. In a process of producing normal propyl mercaptan, the steps of mixing propylene with hydrogen sulfide and with acetone, and effecting the reaction in the liquid state, at a temperature not in execess of about 25° C., and under the deliberate influence of radiations above 3000 Angstrom units but capable of dissociating acetone.

2. In a process of producing normal propyl mercaptan, the steps of mixing propylene with hydrogen sulfide and with acetaldehyde, and effecting the reaction in the liquid state, at a temperature not in excess of about 25° C., and under the deliberate influence of radiations above 3000 Angstrom units but capable of dissociating acetaldehyde.

3. In a process of effecting abnormal addition of hydrogen sulfide to an aliphatic hydrocarbon containing an alpha unsaturated linkage, the steps of adding an aliphatic ketone which is decomposed by light having a wave length above 3000 Angstrom units to the reaction mass, and effecting the reaction in the absence of peroxides, at a temperature not in excess of about 25° C., and under the deliberate influence of radiations above 3000 Angstrom units but capable of dissociating the aliphatic ketone.

4. In a process of effecting abnormal addition of hydrogen sulfide to an aliphatic hydrocarbon containing an alpha unsaturated linkage, the steps of adding a ketone which is decomposed by light having a wave length above 3000 Angstrom units to the reaction mass, and effecting the reaction in the absence of peroxides, at a temperature not in excess of about 25° C., and under the deliberate influence of radiations above 3000 Angstrom units but capable of dissociating the ketone.

5. In a process of effecting abnormal addition of hydrogen sulfide to an aliphatic hydrocarbon containing an alpha unsaturated linkage, the steps of adding an aldehyde which is decomposed by light having a wave length above 3000 Angstrom units to the reaction mass, and effecting the reaction in the absence of peroxides, at a temperature not in excess of about 25° C., and under the deliberate influence of radiations above 3000 Angstrom units but capable of dissociating the aldehyde.

6. In a process of effecting abnormal addition of hydrogen sulfide, the steps of mixing an unsaturated hydrocarbon containing an unsaturated linkage between two carbon atoms having a dissimilar number of hydrogen atoms attached thereto, with hydrogen sulfide and a ketone which is decomposed by light having a wave length above 3000 Angstrom units, and effecting the reaction photochemically, in the absence of peroxides, and under the deliberate influence of radiations above 3000 Angstrom units but capable of dissociating the ketone.

7. In a process of effecting abnormal addition of hydrogen sulfide, the steps of mixing an unsaturated hydrocarbon containing an unsaturated linkage between two carbon atoms having a dissimilar number of hydrogen atoms attached thereto, with hydrogen sulfide and an aldehyde which is decomposed by light having a wave length above 3000 Angstrom units, and effecting the reaction photochemically, in the absence of peroxides, and under the deliberate influence of radiations above 3000 Angstrom units but capable of dissociating the aldehyde.

8. In a process of effecting abnormal addition of hydrogen sulfide, the step of reacting an unsaturated hydrocarbon containing an unsaturated linkage between two carbon atoms having a dissimilar number of hydrogen atoms attached thereto, with hydrogen sulfide photochemically, in the absence of peroxides, in the presence of a carbonylic compound which is decomposed by light having a wave length above 3000 Angstrom units selected from the class consisting of ketones, aldehydes and acid halides, and under the deliberate influence of radiations above 3000 Angstrom units but capable of dissociating the carbonylic compound under the operating conditions.

9. In a process of producing di-normal propyl thio-ether, the steps of mixing proplene with normal propyl mercaptan and acetone, and effecting the reaction in the liquid state, at a temperature of below about 25° C., and under the deliberate influence of radiations above 3000 Angstrom units but capable of dissociating the acetone.

10. In a process of producing thio-ethers, the steps of contacting an aliphatic hydrocarbon containing an alpha unsaturated linkage with a mercaptan, and subjecting said mixture, in the liquid state, at a temperature of below about 25° C., and in the presence of a carbonylic compound which is decomposed by light having a wave length above 3000 Angstrom units selected from the class consisting of ketones, aldehydes and acid halides, to the influence of radiations above 3000 Angstrom units but capable of decomposing said carbonylic compound under operating conditions.

11. In a process of producing thio-ethers, the steps of contacting an unsaturated hydrocarbon having at least one unsaturated linkage between two carbon atoms having a dissimilar number of hydrogen atoms attached thereto with a cercaptan and subjecting the reactants photochemically, in the absence of peroxides and in the presence of a carbonylic compound which is decomposed by light having a wave length above 3000 Angstrom units selected from the class consisting of ketones, aldehydes and acid halides, to the influence of radiations above 3000 Angstrom units but capable of decomposing said carbonylic compound under the operating conditions.

12. In a process for effecting reactions via abnormal addition, the steps of reacting an unsaturated hydrocarbon having at least one unsaturated linkage between two carbon atoms having a dissimilar number of hydrogen atoms attached thereto with a compound selected from the class consisting of hydrogen sulfide and mercaptans, in the presence of a carbonylic compound which is decomposed by light having a wave length above 3000 Angstrom units selected from the class consisting of ketones, aldehydes and acid halides, and effecting the reaction photochemically, in the absence of peroxides and under the deliberate influence of radiations above 3000 Angstrom units but capable of decomposing said carbonylic compound.

13. In a process for effecting reactions via abnormal addition, the steps of reacting an unsaturated organic compound containing an unsaturated linkage between two carbon atoms having a dissimilar number of hydrogen atoms attached thereto with a compound selected from the class consisting of hydrogen sulfide and mercaptans, in the presence of a carbonylic compound which is decomposed by light having a wave length above 3000 Angstrom units selected from the class consisting of ketones, aldehydes and acid halides, and effecting the reaction photochemically, in the absence of peroxides and under the deliberate influence of radiations above 3000 Angstrom units but capable of decomposing said carbonylic compound.

WILLIAM E. VAUGHAN.
FREDERICK F. RUST.